Dec. 6, 1955
J. R. CLARK-RIEDE
2,725,971
DEVICE FOR FEEDING AND ORIENTING ARTICLES
Filed Aug. 21, 1952
3 Sheets-Sheet 1
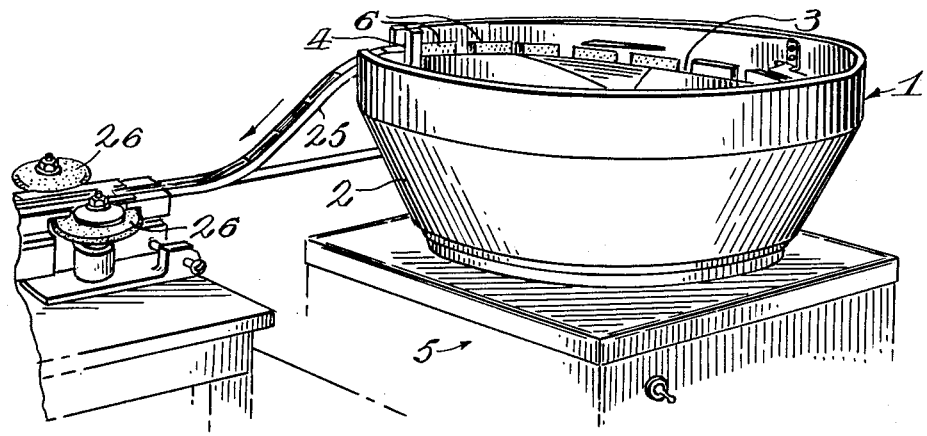
Fig-1
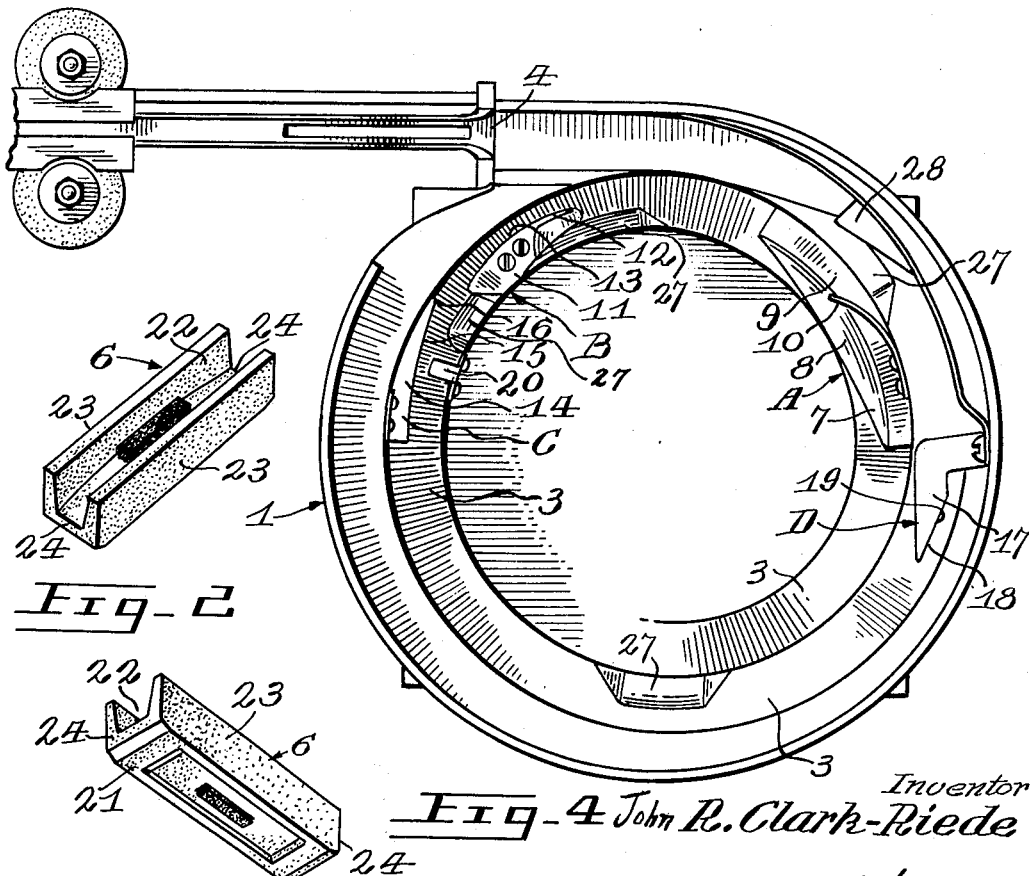
Fig-2
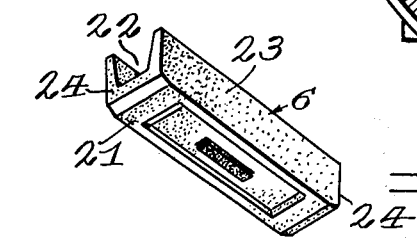
Fig-3
Fig-4
Inventor
John R. Clark-Riede
By Robert B. Harmon
Attorney Dec. 6, 1955                J. R. CLARK-RIEDE                2,725,971
DEVICE FOR FEEDING AND ORIENTING ARTICLES
Filed Aug. 21, 1952                              3 Sheets-Sheet 2

Inventor
John R. Clark-Riede
By Robert B. Harmon
Attorney

Dec. 6, 1955     J. R. CLARK-RIEDE     2,725,971
DEVICE FOR FEEDING AND ORIENTING ARTICLES
Filed Aug. 21, 1952     3 Sheets-Sheet 3
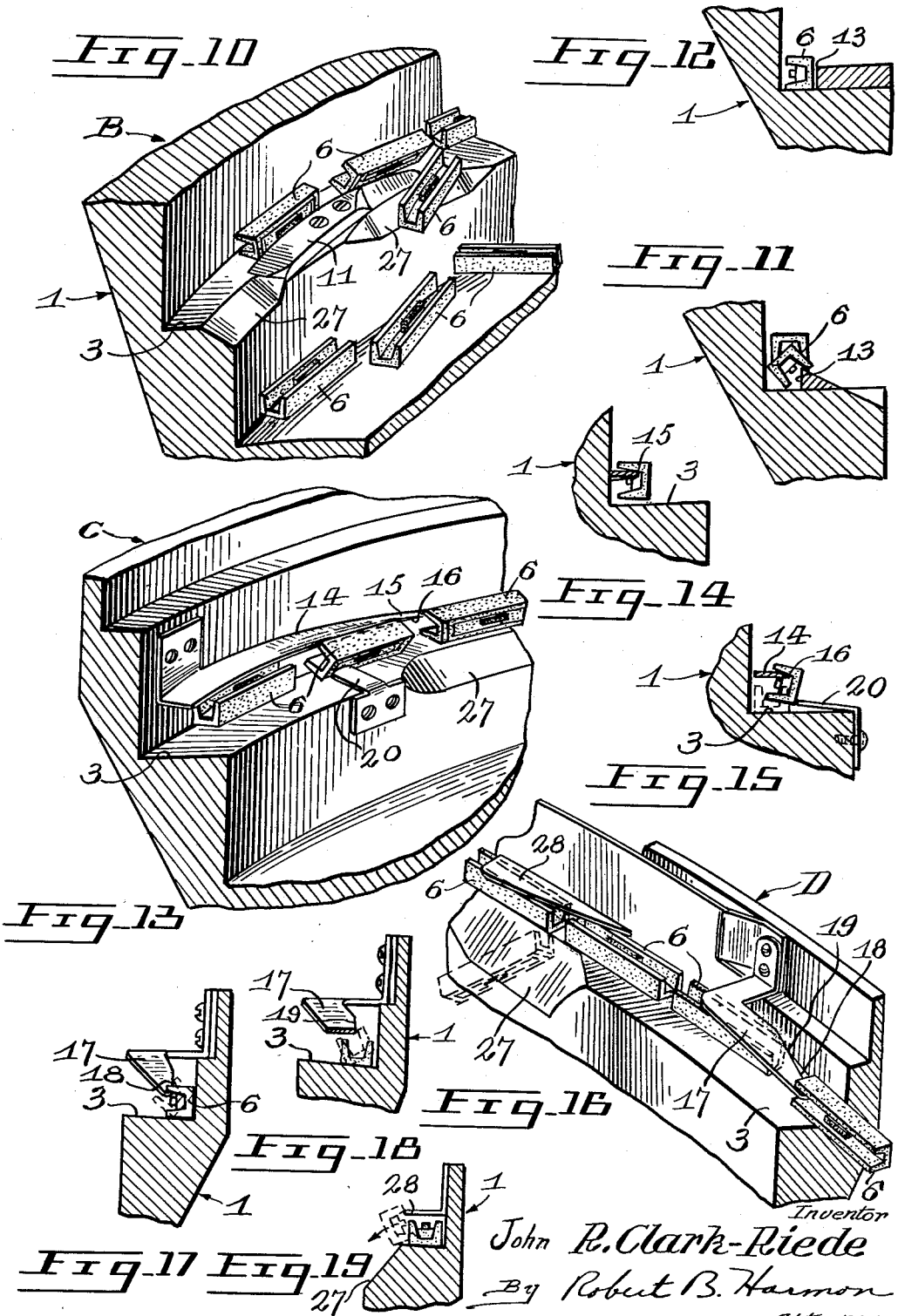
Inventor
John R. Clark-Riede
By Robert B. Harmon
Attorney

United States Patent Office 2,725,971
Patented Dec. 6, 1955

2,725,971

DEVICE FOR FEEDING AND ORIENTING ARTICLES

John R. Clark-Riede, Montreal, Quebec, Canada, assignor to Northern Electric Company, Limited, Montreal, Quebec, Canada, a corporation of Canada Application August 21, 1952, Serial No. 305,533

5 Claims. (Cl. 198—33)

This invention relates to article feeding apparatus and more particularly to a hopper-type feeding device which is designed to automatically orient and feed unsymmetrical shaped articles, introduced into the hopper in random or promiscuous association so as to deliver them in a uniform position to another device for conditioning.

There are various types of hopper devices known in the art which are designed for the purpose of arranging articles in a uniform position and feeding them to a machine for conditioning from a mass of articles deposited in the hopper in random or jumbled relationship. One type of these devices consists of a circular hopper, which is oscillated about a vertical axis so as to impart movement to the articles deposited therein, and having a peripheral feed track which slopes upwardly from the bottom of the hopper in a spiral path for guiding the articles in advancing movement therealong to a discharge end. These devices depend for their operation that articles, which do not attain the selected position as they advance up the spiral path, are returned to the hopper for further tumbling until they assume the proper position. Because of the fact that the attainment of the selected position is left to chance, the output of such devices is slow with relation to the amount of tumbling of the articles in the hopper and also the rate of travel of the articles cannot be definitely determined with a result that a considerable amount for supervision of the device is required. In addition, the repeated tumbling is liable to damage fragile articles being tumbled, such as chipping.

It is the general object of my invention to provide an improved orienting and feeding device of the hopper type in which the orienting and feeding of the articles is accomplished rapidly, economically and with the minimum amount of tumbling.

It is another object of my invention to provide a device of the hopper type adapted to orient and feed fragile articles with the minimum of damage.

It is a further object of my invention to provide an orienting and feeding device of the hopper type in which the rate of travel of the articles up the trackway can be adjusted to a predetermined value.

It is also an object of my invention to provide an orienting and feeding device of the hopper type which, by virtue of the predetermined rate of travel of the articles up the spiral trackway, the movement of the articles is substantially smooth and at a uniform rate.

It is also an object of my invention to provide an orienting and feeding of the hopper type which, by virtue of the predetermined rate of travel of the articles up the spiral trackway, the device can be operated for a considerable period without attention.

Another object of my invention is to provide an orienting and feeding device of the hopper type which, by virtue of the adjustable rate of travel of the articles up the spiral trackway to a discharge point in correlation with the rate of supply of the articles from the discharge point to a conditioning mechanism, the building up and the subsequent jamming of the articles in the trackway as they move forward is prevented.

These objects are obtained by the present invention by providing a stationary supply hopper, into which the articles to be fed and oriented are deposited, with a peripheral trackway sloping upward from the bottom of the hopper in a spiral path which guides the movement of the articles thereon as the hopper is agitated at a rapid rate. Selector elements, which project into the track and which are arranged along thereto, orient the articles as they move along the trackway irrespective of the position they assume as they leave the floor of the hopper, to the selected position, the selector element applying depending on the configuration of the face presented to the elements. Driven roll feeds are provided to continue the conveying of the articles to the conditioning mechanism as they leave the hopper, these rolls assuming the feeding direct to the conditioning mechanism. The rate of the presentation of the articles to the conditioning mechanism is correlated to the rate of travel of the articles up the trackway so as to prevent the building up and subsequent jamming of the articles in the trackway.

These and other objects and advantages of the invention will become apparent by referring to the following detailed description and drawings, in which like numbers refer to like parts, illustrating one form in which the invention may be embodied, in which:

Fig. 1 represents a pictorial perspective view of the device, embodying one form of the invention, adapted for the feeding and the orientating of telephone protector blocks.

Figs. 2 and 3 represents a top and bottom perspective view of the telephone protector blocks to be fed and oriented by the device.

Fig. 4 represents a top plan view of the device.

Figure 5:
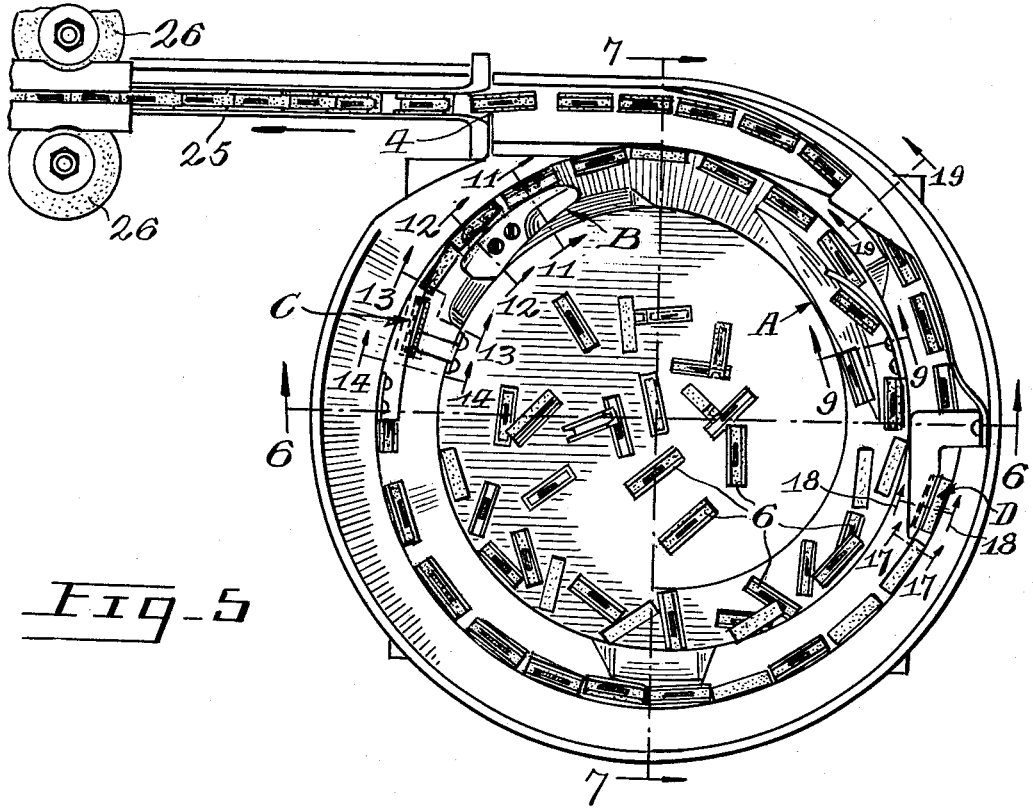
Fig. 5 represents a top plan view of the device showing the disposal of the telephone protector blocks as they travel up the trackway.
Figure 6:
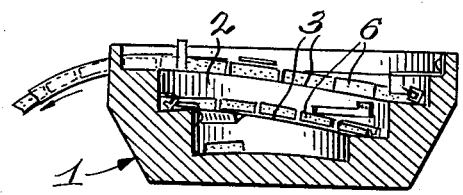
Figure 7:
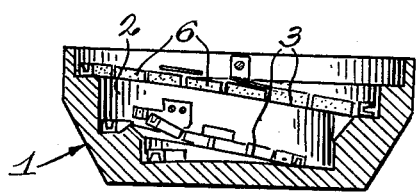

Figs. 6 and 7 represent a cross-sectional view, in elevation, of the device taken at the line 6—6 and 7—7, Fig. 5, respectively, in the direction of the arrows.

Figure 8:
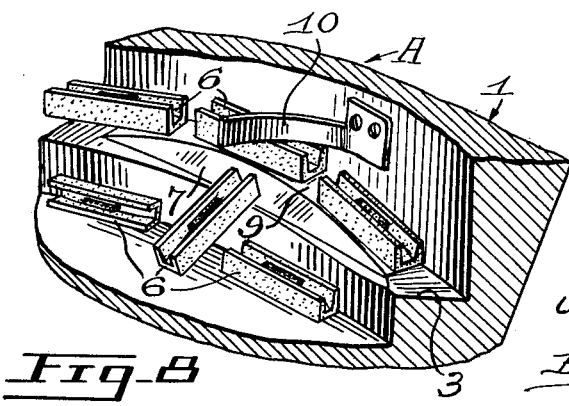

Fig. 8 represents a fragmentary view of a section of the device in elevation, taken at A, Fig. 5, showing the disposal of the articles, as they start their journey up the trackway, when travelling two or more abreast on two or more tiers.

Figure 9:
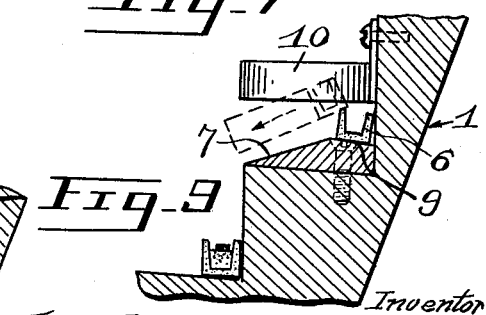

Fig. 9 represents a transverse section taken at A, Fig. 5, at the lines 9—9 in the direction of the arrows.

Fig. 10 represents a fragmentary view of a section of the device in elevation, taken at B, Fig. 5, showing the orientation of the articles from a position of fins down to a position of fins out.

Figs. 11 and 12 represent transverse sections taken at B, Fig. 5, at the lines 11—11, 12—12 in the direction of the arrows, as the blocks advance through the orientating selector.

Fig. 13 represents a fragmentary view of a section of the device in elevation, taken at C, Fig. 5, showing the orientation of the articles from a position of fins in toward the wall of the hopper to a position of fins up.

Figs. 14 and 15 represent a transverse section taken at C, Fig. 5, at the lines 13—13, 14—14 in the direction of the arrows, as the blocks advance through the orientating selector.

Fig. 16 represents a fragmentary view of a section of the device in elevation, taken at D, Fig. 5, showing the orientation of the articles from a position of the fins out from the wall of the hopper to a position of fins up.

Figs. 17 and 18 represent a transverse section taken at D, Fig. 5, at the lines 17—17, 18—18 in the direction of the arrows, as the blocks advance through the orientating selector.

Fig. 19 represents a transverse section taken at the lines 19—19, Fig. 5, in the direction of the arrows, showing a deflecting baffle for rejecting any blocks with fins in or out toward the hopper wall.

The device, as will be described, is adapted to feed and orient telephone protector blocks with the fins up as in Fig. 2, so that the block can be presented to a conditioning mechanism, such as grinding machine, the blocks 6, as in Figs. 2 and 3, being constructed with a recess 21, a groove 22 and fins 23 and face 24.

Referring to the drawings, 1 represents a hopper type apparatus comprising a bowl 2, the walls of which slope gently downward and inward to the floor of the bowl, which has a peripheral feed tract 3, progressing upwardly in a spiral path through approximately 1½ convolutions, terminating at the point 4 of the bowl. The hopper is fixed to an actuating device 5, not shown, which agitates the hopper bowl about a vertical axis of the bowl at a predetermined frequency in such a manner that it allows a forward movement to the articles being fed and oriented. The actuating device 5 is a well known commercial device, such as the "Syntron" vibratory feeder, and therefore need not be described. Under the influence of the agitations, the protector blocks 6, positioned in random and jumbled relation on the hopper bowl floor, move up the spiral path 3.

As shown in Figs. 4 and 5 and in more detail in Fig. 8, the track 3 is provided with a lead off slide 7, having the cut away face 8 and an upper face 9, and a deflecting baffle 10, each located at the point A as well as several safety lead off slides 27.

Located at the points B, C and D of the track 3 are selector elements 11, 14 and 17 as shown in Figs. 4 and 5 and more in detail in Figs. 10, 13 and 16, respectively. These elements, which project into the trackway 3, are provided with edges 12, 15 and 18 respectively, for guiding the blocks as they orient the blocks passing therethrough and have their faces 13, 16 and 19 respectively, shaped so as to give the article being oriented a turning motion. The shape of these faces 13, 16 and 19 depends on the contour of the article being oriented. The numeral 28 represents a safety deflecting baffle. These elements can be made of any suitable material, but should be made of such material as to give a sliding contact with the article being fed and oriented with the minimum resistance or with a specified resistance depending on the article being fed and oriented as will be explained hereinafter.

The numeral 20 represents a gauge, Fig. 13. The numeral 25 represents the conveying means between the hopper 1 and the conditioning mechanism. The conveying means may be of channel form in order to maintain the block therein. The numeral 26 represents the variable speed feed rollers driven by any suitable means, not shown.

In the operation of the device a quantity of blocks are deposited on the floor of the hopper 1 in random or jumbled relation and the hopper then agitates by the oscillator 5.

If two or more of the blocks 6 leave the hopper floor abreast as they move up the spiral path 3 then the excess blocks over one are rejected back to the hopper floor, to be tumbled again, through face 8 of the lead off slide 7 as shown in Figs. 8 and 9 and located at A, Figs. 4 and 5. If two or more of the blocks 6 move up the spiral path 3 in tiers, then the excess over one tier is rejected back to the hopper floor to be tumbled again, by the deflecting baffle 10 shown in Figs. 8 and 9 and located at A in Figs. 4 and 5. The bottom of the baffle 10 is located at a sufficient height above the face 9 of the slide 7 so as to permit the blocks 6 proceeding in a single file and tier to pass thereunder and so advance up the trackway. All the blocks in a single file continue to move up the trackway irrespective of their positions that is, with fins down, in or out toward the hopper wall, or up.

As the blocks 6 proceed up the trackway those blocks with the fins turned down will be oriented by the selector element 11 shown in Figs. 10, 11 and 12 and located at B, Figs. 4 and 5, to assume a position with fins out. The groove 22 of the block 6 is engaged in frictional contact with the edge 12 of the selector element 11, the edge serving as a guide as the block is oriented to the fins out position by sliding engagements with the sloping face 13 of the element 11. Any of the blocks which enters the element 11 with fins in or out will pass therethrough, the edge 12 acting as a guide. Any of the blocks which have their fins up, the correct position, will pass over the element, the inward slope of the face 13 and the fact that the agitation of the hopper tends to be inwardly acting to maintain the blocks on the trackway.

As the blocks continue to proceed up the trackway 3 any of the blocks with their fins 23, 23 in toward the wall of the hopper bowl, will be oriented to the correct position of fins up by the selector element 14, Figs. 13, 14 and 15, which is located at the point C, Figs. 4 and 5. The groove 22 of these blocks engages in frictional contact the edge 15 of the selector element 14, the edge serving as a guide as the block is oriented to the correct position of fins up by sliding engagement with the sloping face 16 of the selector element. In order to maintain the blocks on the trackway and to restrict the space through which the blocks being oriented pass, a gauge 20, Fig. 13, is provided. Any of the blocks with their fins up will pass under the element 14 the edge 15 acting as a guide, the edge 15 of the element 14 should be set at a sufficient height above the trackway as to allow face 24 of the block 6 to pass therethrough. Any blocks with their fins out from the wall of the bowl of the hopper will also pass through the element 14, the lower fins 23 passing under gauge 20. The recess 21 of the block 6 determines the space between the gauge 20 and the edge 15.

All the blocks have now been oriented to their correct position with the exception of those which left the floor of the hopper with their fins 23, 23 out and those oriented at B from a fins down to a fins out position. The blocks with their fins out are now oriented by the element 17, Figs. 16, 17 and 18, which is located at the point D, Figs. 4 and 5. The groove 22 of the block 6 with their fins 23, 23 out engages the edge 18 of the element 17, the edge serving as a guide as the block is oriented to the correct position of fins up by sliding engagement with the sloping face 19 of the element. All the remaining blocks which are in the correct position of fins up are passed under the element 17, the edge 18 of the element 17 being set at a sufficient height above the trackway 3 to permit this.

The blocks advance to the opening 4 of the hopper 1 and thence along the channel 25 to variable speed driven feed rollers 26 and to a conditioning machine which may be a grinding mechanism. The roll feeds have a dual purpose, one to assume the feeding thrust under the grinding wheel and to eliminate any chance of the vibration mode of the hopper being strong enough to overcome the friction in feeding the blocks to the grinder but too weak to pass the blocks under the grinder. This would cause a building up of the blocks and consequently jamming. The blocks are therefore delivered to the rollers by the vibration of the hopper and the rollers then control the rate of feed to the grinder. The rate of travel of the blocks as they pass to the grinding machine can thus be synchronized with the rate of travel of the blocks in the hopper by adjusting the speed of the rollers and the rate of vibration of the hopper.

The contact resistance presented to the articles by the selector elements as they slide thereover will depend on the nature of the article being oriented, some elements presenting more resistance than others, and consequently on the design of the elements. The articles may therefore proceed through some of the elements at a slower or greater rate than through the other elements resulting in the jamming of the article in the trackway. In order to avoid this difficulty the elements may be made of such material so as to have a contact resistance to compensate for this different rate of the advancement of the article through the elements. This condition may also be avoided by providing the surface of the trackway and the walls of the hopper bowl with a finish at such sections as is necessary to compensate the difference in rate of the advancement of the articles through the elements. Thus the elements may be made from steel treated by sand-blasting, surface etching, sprayed or coated with a resistance material such as carbon particles or by other similar means to retard the rate of movement of the articles up the trackway or on the other hand by polishing, buffing, coating or plating so as to advance the rate of movement of the articles up the trackway. Likewise the surface of the trackway may be so treated. The degree of treatment of the above surfaces will depend on the nature of the articles being fed and oriented.

If any of the blocks should break away from the hopper bowl wall, as they move along the outer edge of the trackway, the trackway being of sufficient width as to allow two blocks to move in pairs, then those blocks out of line will be rejected back into the hopper floor by the cut-aways 27 to be retumbled by means of downward chutes at the outer cut of the trackway or by deflecting baffles. If any of the blocks should appear with their fins in or out toward the hopper wall as they travel past the selector 16 then they are rejected back into the hopper to be retumbled by the deflecting baffle 28 shown in Fig. 19. This device can orient any of the blocks on their passage up the trackway into the desired plane regardless of the position they may assume when starting up the trackway, the only rejects being those in excess of the line. Since the orientation of the points is based on intent, the rate of feed can be established mathematically resulting in a minimum amount of supervision.

It is to be observed that the apparatus is adaptable for articles of different configuration by changing the contours and shapes of the sliding surfaces of the selector elements and adjusting the spacings between the elements and the trackway, also the design of the trackway for the hopper bowl.

What is claimed is:

1. In a device for automatically feeding and orienting individual unsymmetrical shaped articles from a promiscuous arrangement to a supply point in a predetermined position having a hopper in which a quantity of the articles may be tumbled, a curved peripheral trackway extending from the floor of the hopper to the top thereof, oscillating means for agitating the hopper so as to elevate a layer of articles up the trackway, and, in spaced succession as the articles are advanced up the trackway, means located on the trackway for rejecting all the advancing articles, except those advancing in a single file, a second means located on the trackway for rejecting all articles except those advancing in a single tier, and means comprising a plurality of spaced selector contour elements projecting into the trackway for orienting the advancing articles to a right side up position by sliding contact therewith.

2. In an automatic orienting and feeding apparatus in accordance with claim 1, an outlet at the top of the said hopper, conveying means having driven means for advancing the articles from the outlet to a conditioning mechanism, driving means for the driven means and means associated with the driving means to control the rate of feed of said articles to the conditioning mechanism.

3. In an automatic orienting and feeding apparatus in accordance with claim 1 in which said articles has a cam groove therein, said selector contour elements being cam faced and having a guide edge engageable with said groove, the contour of the face of said elements being such that the outer or inner walls of the groove may slide thereover, only in one position of the article, to orient the article into the selected position.

4. In an automatic orienting and feeding apparatus in accordance with claim 1, in which said first rejecting means comprises a deflecting device, said second rejecting means comprises a deflecting baffle projecting into the trackway and located at a selected distance thereof to allow the articles advancing in a single file and tier to pass therebeneath.

5. In an automatic orienting and feeding apparatus in accordance with claim 1, in which said articles have a slidable guiding means, said selector contour elements having a guide edge engageable with said guiding means and a sloping face the contour of which is such that the article may slide thereover in association with said guiding means to orient the article into the selected position.

References Cited in the file of this patent

UNITED STATES PATENTS

| Number | Name | Date |
|---|---|---|
| 1,450,225 | Rebstock | Apr. 3, 1923 |
| 1,833,637 | Dennison | Nov. 24, 1931 |
| 1,959,735 | Phillips | May 22, 1934 |
| 2,159,049 | Quamma | May 23, 1939 |
| 2,324,246 | Thompson | July 13, 1943 |
| 2,586,523 | Dudley | Feb. 19, 1952 |
| 2,609,914 | Balsiger | Sept. 9, 1952 |
| 2,629,483 | Schweiter | Feb. 24, 1953 |
| 2,639,034 | Roeber | May 19, 1953 |
| 2,658,609 | Weyandt | Nov. 10, 1953 |
| 2,661,833 | Spurlin | Dec. 8, 1953 |
| 2,665,005 | Mundy | Jan. 5, 1954 |
| 2,714,440 | Forty et al. | Aug. 2, 1955 |